Aug. 30, 1927.

W. B. SOUTHERN 1,640,968

AUTOMOBILE SEAT

Filed July 8, 1925

3 Sheets-Sheet 1

WITNESSES:

INVENTOR
William B. Southern
BY
HIS ATTORNEY

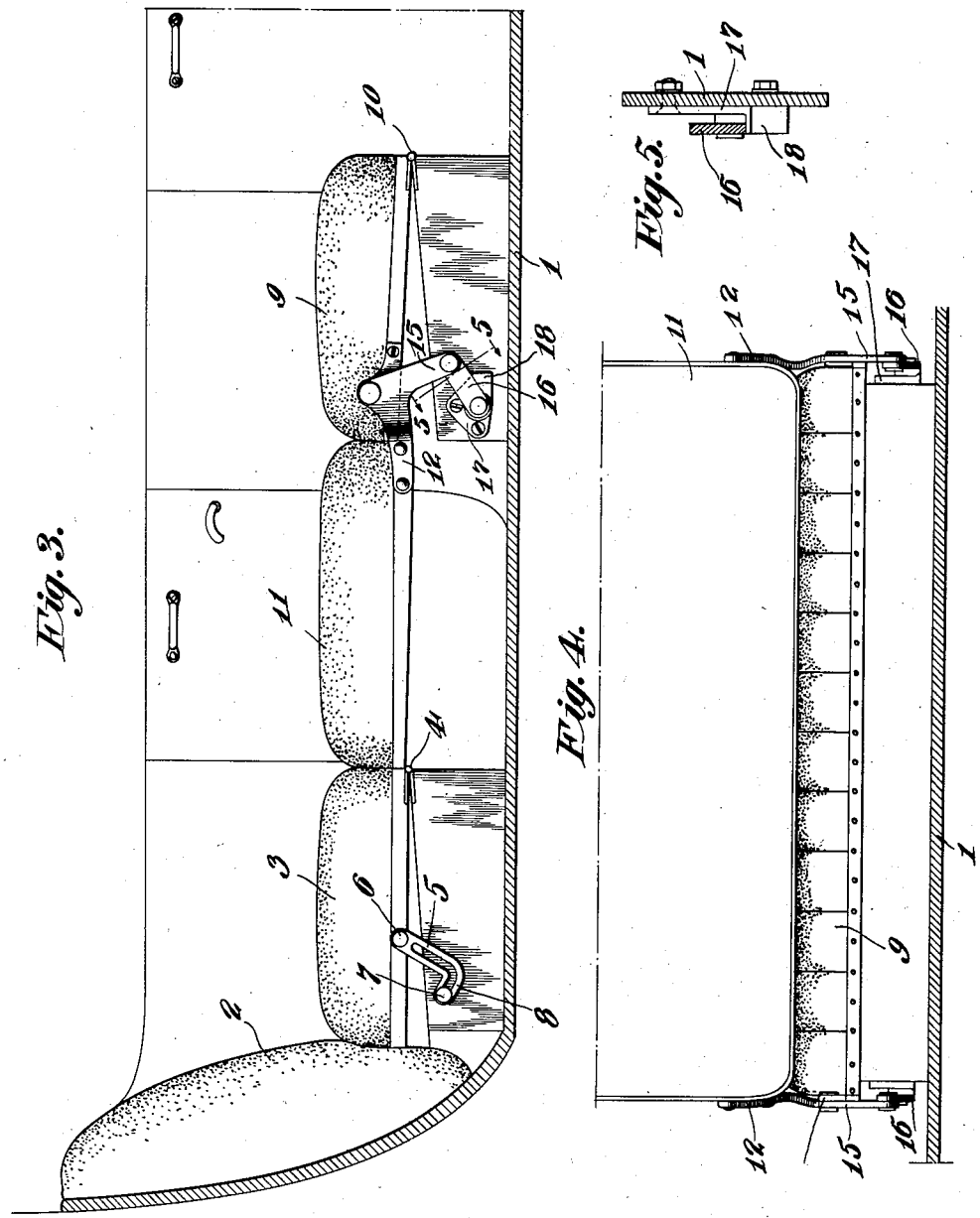

Aug. 30, 1927.

W. B. SOUTHERN 1,640,968

AUTOMOBILE SEAT

Filed July 8, 1925

3 Sheets-Sheet 3

WITNESSES:

INVENTOR
William B. Southern
BY Joshua R. H. Potts
HIS ATTORNEY

Patented Aug. 30, 1927.

1,640,968

UNITED STATES PATENT OFFICE.

WILLIAM B. SOUTHERN, OF PHILADELPHIA, PENNSYLVANIA.

AUTOMOBILE SEAT.

Application filed July 8, 1925. Serial No. 42,115.

My invention relates to automobile seats and its object is to provide seats of the inclined type such as are now the accepted standard for use in automobiles, which may be swung on their mountings to a position to form a substantially level bed.

This object, and other advantageous ends which will be described hereinafter. I attain in the following manner, reference being had to the accompanying drawings in which—

Figure 1:
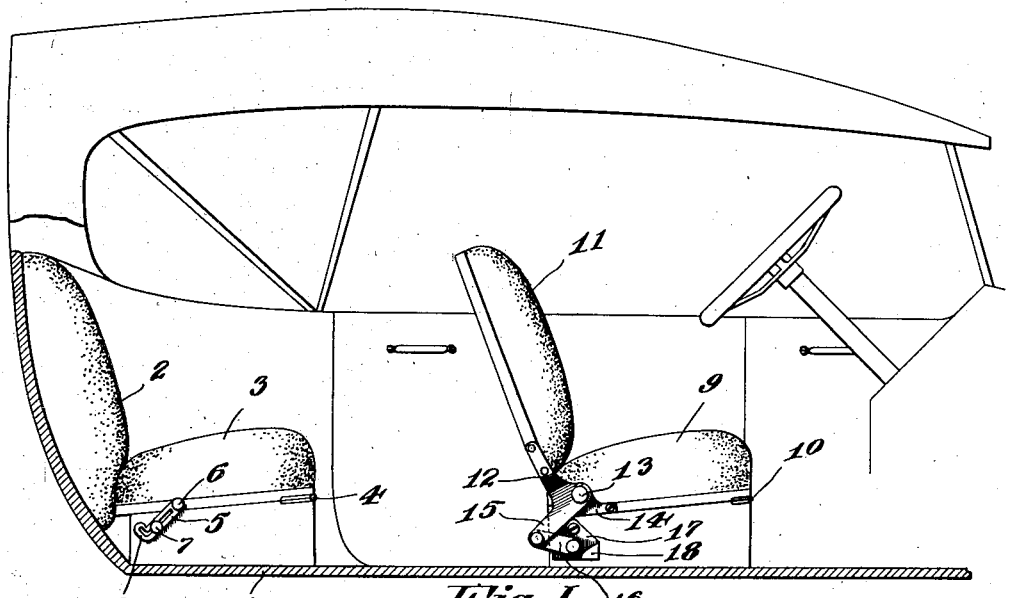
Figure 2:
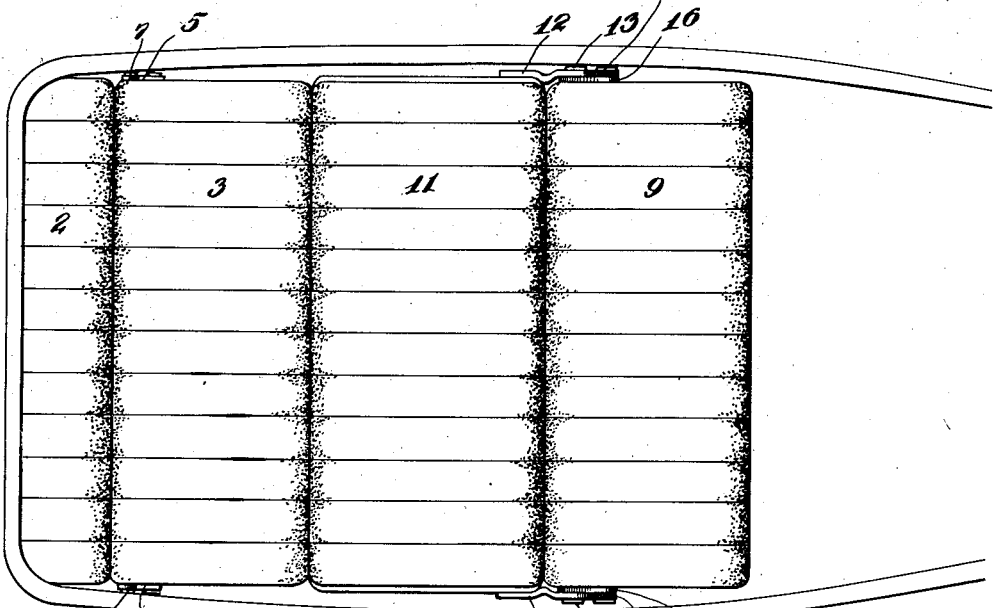
Figure 6:
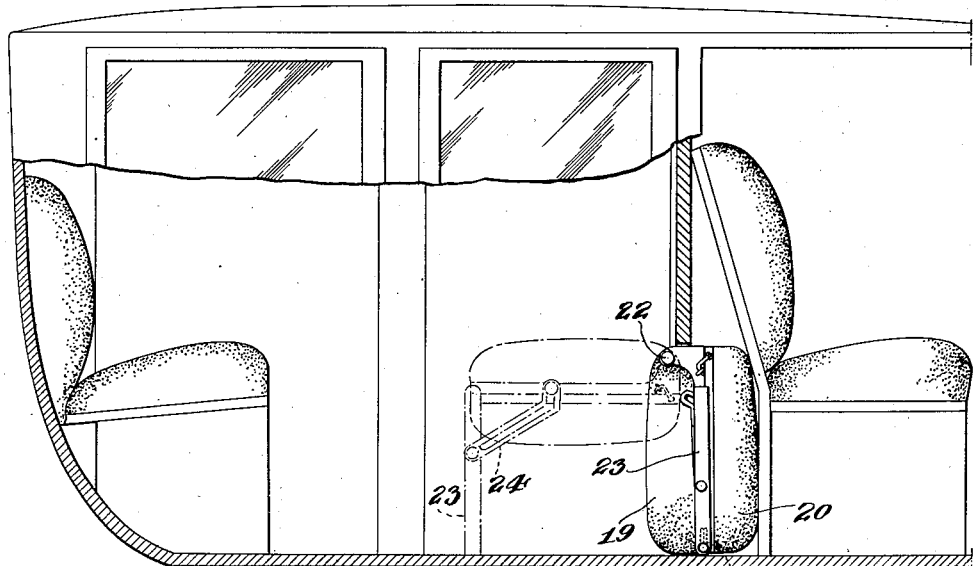
Figure 7:
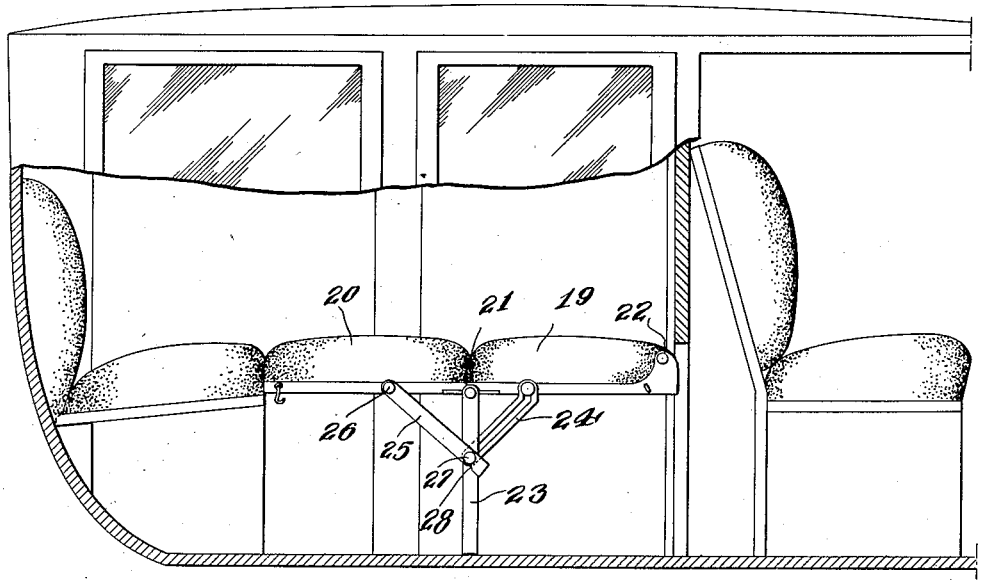

Figure 1 is a side elevation of seats made in accordance with my invention showing them as they would be secured to the body of an automobile, Figure 2 a plan view of the seat shown in Figure 1 illustrating the seats moved to a position to form a bed, Figure 3 an enlarged side view of the seats as shown in Figure 2, Figure 4 a rear view of the front seat shown in Figure 1, Figure 5 a section on line 5—5 of Figure 3, Figure 6 a side elevation of another form of seat, and Figure 7 a view similar to Figure 6 illustrating the elements in another position.

Referring to the drawings, particularly Figures 1–5, 1 indicates the body of an automobile, 2 the back of the rear seat fixed to the body, 3 the cushion of the rear seat hinged to the body at 4. The cushion is swung on its hinges to a raised position and is held in this position by a slotted brace 5 pivoted to the cushion at 6 and slidably connected with a pin 7 on the body. The slot has an off-set part 8 into which the pin fits when the cushion is in its raised position as shown in Figure 3.

The front seat has a cushion 9 hinged to the body at 10. A back 11 of the front seat has a bracket 12 at each side pivoted at 13 to a bracket 14 on each side of cushion 9. Each bracket 12 has an arm 15 pivotally connected to a link 16 pivoted on a plate 17 secured to each side of the seat-supporting part of the body. Each plate has a shoulder 18 against which link 16 is adapted to abut to hold the parts in the bed-forming position.

In Figures 6 and 7, I have shown a pair of bed sections 19 and 20 hinged together at 21, and section 19 hinged to the body at 22. When the sections are swung from the full line position to the dot-and-dash line position shown in Figure 6, a leg 23 pivoted on hinge 21 is swung with a slotted brace 24 in position to form a rigid support for section 19. The section in this position may be used as a seat. When section 20 is swung from under section 19 to the position shown in Figure 7, a brace 25 pivoted to section 20 at 26 is connected with a pin 27 on leg 23 by slipping its notch 28 over the pin. The sections in this position form a substantially level bed with the cushion of the rear seat.

To swing the back and cushion of the front seat into a bed forming-position, the back is raised slightly to bring each link 16 past its dead center relatively to the arm 15, and then swing downward until links 16 abut shoulders 18. When the links abut the shoulders they lock the back and cushion against further movement in that direction, and provide a firm support for keeping the back and cushion in a substantially horizontal position as shown in Figure 3. The cushion of the rear seat is then raised to be level with the back and cushion of the front seat. The off-set part of brace 5 fits over pin 7 when the cushion is in this position.

To raise the back and return the cushion of the front seat to their former position, the back is simply raised to the position shown in Figure 1. Link 16 will automatically cause the parts to return to their former position and will lock the parts against accidental movement to the bed-forming position.

The back and cushion connected in this manner will remain locked in the seat-forming position under the ordinary use of the seat and will remain locked in the bed-forming position without additional supports at the free end of the back.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the body of an automobile, a cushion hinged to the body; a back pivoted to the cushion; an arm fixed to each side of the back, and a link pivotally connected to each arm and to the body forming with said arms a pair of levers, the pivot of said levers being adapted to be moved from one side to the other of the line of centers to support the back and cushion in a seat-forming position and a bed-forming position.

2. In combination with the body of an automobile, a cushion hinged to the body; a back pivoted to the cushion; an arm fixed to each side of the back; links connected with the arms and pivoted to the body, said links and arms being adapted to be swung from one side to the other of a line of centers through said pivots, whereby the back and cushion will be held in a seat forming position, when the arms are positioned on one side of the line of centers through said pivots, and in a bed-forming position when the arms are swung to the other side of said line of centers; and an abutment secured to the body adapted to be engaged by the links to support the back and cushion in the bed forming position.

3. A device as set forth in claim 1 further characterized by plates connected to the body and to which the links are pivotally connected, and shoulders on the plates adapted to be abutted by the links to hold the back and cushion in the bed-forming position.

4. In combination with the body of an automobile, an inclined cushion movably connected with the body; an inclined back, and arms pivotally connecting the back with the cushion; links connecting said arms with the body, said arms and links being adapted to be swung from one side to the other of the line of centers through the connection therebetween, whereby the back and cushion will be supported in an inclined seat forming position, will be moved simultaneously to a horizontal bed forming position, said arms and levers being arranged that the back and cushion when in either inclined seat forming or horizontal bed forming position are prevented from accidentally assuming the other position.

In testimony whereof I have signed my name to this specification.

WILLIAM B. SOUTHERN.